US010214298B2

(12) United States Patent
Fell et al.

(10) Patent No.: US 10,214,298 B2
(45) Date of Patent: Feb. 26, 2019

(54) STATION DESELECT AND CUEING SYSTEM

(71) Applicant: Sikorsky Aircraft Corporation, Stratford, CT (US)

(72) Inventors: William Fell, Stuart, FL (US); Matthew A. White, Milford, CT (US); Matthew T. Luszcz, Hamden, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 98 days.

(21) Appl. No.: 15/401,644

(22) Filed: Jan. 9, 2017

(65) Prior Publication Data

US 2017/0240292 A1    Aug. 24, 2017

Related U.S. Application Data

(60) Provisional application No. 62/298,740, filed on Feb. 23, 2016.

(51) Int. Cl.
*B64D 45/00* (2006.01)
*B64D 31/04* (2006.01)
*B64C 13/10* (2006.01)
*B64D 43/00* (2006.01)

(52) U.S. Cl.
CPC .............. *B64D 45/00* (2013.01); *B64C 13/10* (2013.01); *B64D 31/04* (2013.01); *B64D 43/00* (2013.01); *B64D 2045/0045* (2013.01)

(58) Field of Classification Search
USPC ......................................... 340/945, 963, 971
See application file for complete search history.

(56) References Cited

U.S. PATENT DOCUMENTS

| 5,868,359 | A | 2/1999 | Cartmell et al. |
| 6,314,343 | B1 | 11/2001 | Adams et al. |
| 6,892,081 | B1 * | 5/2005 | Elomaa ............... H04M 1/7258 |
| | | | 379/433.01 |
| 6,913,226 | B2 | 7/2005 | Huynh |
| 8,290,643 | B2 | 10/2012 | Chen et al. |
| 8,494,691 | B2 | 7/2013 | Boorman et al. |
| 8,594,864 | B2 | 11/2013 | Greenfield et al. |
| 8,866,623 | B2 | 10/2014 | Sharon |
| 9,043,043 | B1 | 5/2015 | Gribble et al. |
| 9,164,505 | B1 * | 10/2015 | Peck ..................... B64C 25/426 |

(Continued)

Primary Examiner — Brent Swarthout
(74) Attorney, Agent, or Firm — Cantor Colburn LLP

(57) ABSTRACT

An aircraft is provided and includes an airframe defining a cockpit with first and second control stations configured for co-activation and complementary deactivation, flight control assemblies disposed at multiple locations of the airframe and a flight control computer (FCC). The FCC is configured to control operations of the flight control assemblies in accordance with current flight conditions and commands received at activated ones of the first and second control stations that are inputted by a flight crew. The FCC includes a secondary monitoring system to identify when commands are input at a deactivated one of the first and second control stations, to determine whether the commands are indicative of normal and intentional piloting inputs and to generate control station cues in an event the commands are indicative of normal and intentional piloting inputs to alert the flight crew of a hazardous condition or automatically turn the station back on.

15 Claims, 4 Drawing Sheets

(56) References Cited

U.S. PATENT DOCUMENTS

2008/0039988 A1\* 2/2008 Estabrook ............... B64C 13/18
 701/14
2016/0107763 A1\* 4/2016 Giuliano ................ B64D 43/00
 701/29.1

\* cited by examiner

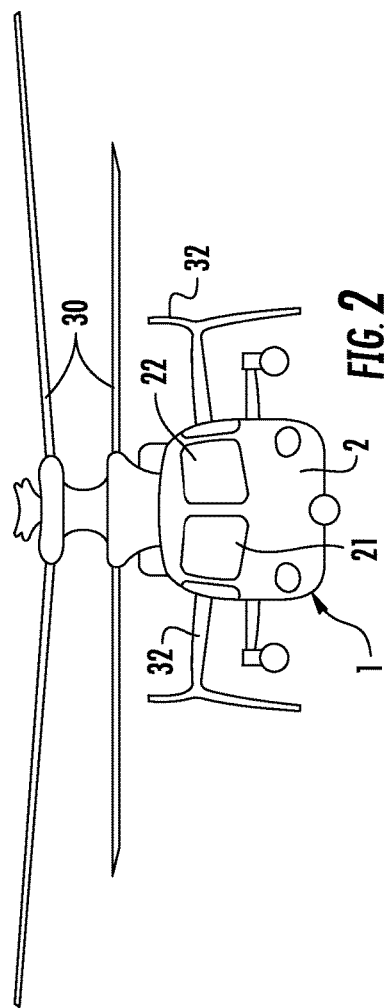
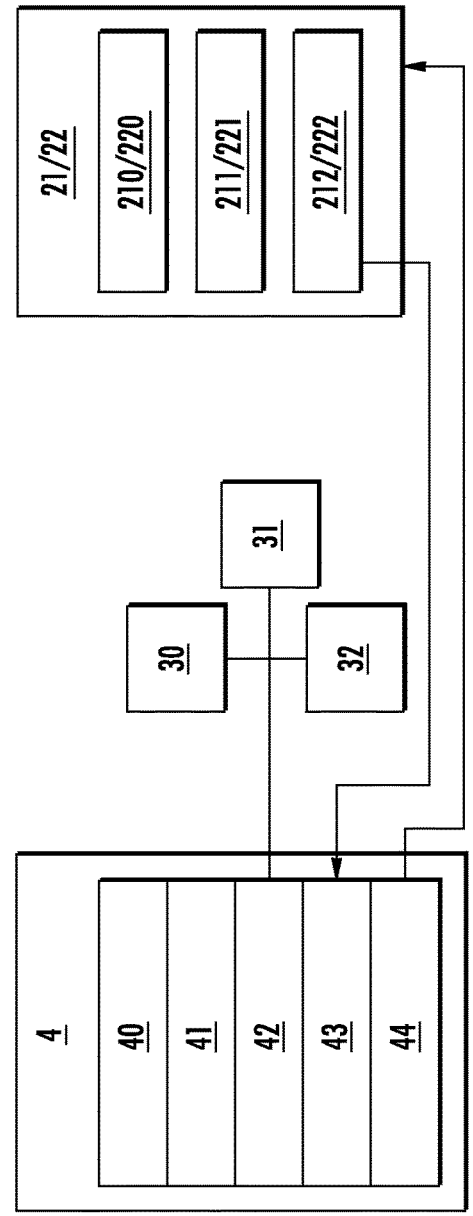

STATION DESELECT AND CUEING SYSTEM

CROSS-REFERENCE TO RELATED APPLICATIONS

This application claims benefit of priority of U.S. Provisional Application No. 62/298,740 filed on Feb. 23, 2016, the disclosure of which is incorporated by reference.

BACKGROUND OF THE DISCLOSURE

The subject matter disclosed herein relates to aircraft control systems and, more particularly, to aircraft station deselect and cueing systems.

In fly by wire aircraft, it is often possible to deselect either the pilot or the copilot flight control station. This feature is available to isolate erroneous inputs from failed sensors in one or more flight axes, to allow ingress/egress into the pilot and copilot flight control stations without making an inadvertent input to the controls, to safely allow a passenger to sit in a pilot or copilot control station and to permit aircraft to account for an incapacitated pilot.

Although there are small display cues that a pilot or copilot control station is turned off, these cues can be missed or ignored as part of the cacophony of other factors crewmen are addressing. Thus, there is potential confusion or delay with respect to determining which of the pilot and the copilot is actually flying the aircraft.

For example, a pilot might attempt to fly the aircraft even though his control station is turned off and the copilot's station is turned on. In such cases, if the copilot is not inputting proper control commands into his control station, neither the pilot nor the copilot would actually be flying the aircraft. If this situation were to occur in an emergency situation, loss of the aircraft and the crew could result.

BRIEF DESCRIPTION OF THE DISCLOSURE

According to one aspect of the disclosure, a method of operating a station deselect safety and cueing system for a flight crew of an aircraft is provided. The method includes identifying when commands are input at a deactivated one of first and second control stations, determining whether the commands input at the deactivated one of the first and second control stations are indicative of normal and intentional piloting inputs and generating control station cues for the flight crew in an event the commands are determined to be indicative of normal and intentional piloting inputs.

In accordance with additional or alternative embodiments, the commands are indicative of normal and intentional piloting inputs based on characteristics of the commands.

In accordance with additional or alternative embodiments, the generating of the control station cues includes generating audio switch cues to cue the flight crew that one of a pilot or a copilot is attempting to control the aircraft via a deactivated control station.

In accordance with additional or alternative embodiments, the generating of the control station cues includes generating visual switch cues to cue the flight crew that one of a pilot or a copilot is attempting to control the aircraft via a deactivated control station.

In accordance with additional or alternative embodiments, the generating of the control station cues includes generating tactile switch cues to cue the flight crew that one of a pilot or a copilot is attempting to control the aircraft via a deactivated control station.

In accordance with additional or alternative embodiments, the method further includes automatically activating the deactivated one of the first and second control stations.

According to one aspect of the disclosure, an aircraft is provided and includes an airframe defining a cockpit with first and second control stations that are configured for co-activation and complementary deactivation, flight control assemblies operably disposed at multiple locations of the airframe and a flight control computer (FCC). The FCC is configured to control operations of the flight control assemblies in accordance with current flight conditions and commands received at activated ones of the first and second control stations that are inputted by a flight crew. The FCC includes a secondary monitoring system to identify when commands are input at a deactivated one of the first and second control stations, to determine whether the commands are indicative of normal and intentional piloting inputs and to generate control station cues for the flight crew in an event the commands are indicative of normal and intentional piloting inputs.

In accordance with additional or alternative embodiments, the flight control assemblies include main rotor assemblies, propeller or auxiliary propulsion assemblies, and controllable surface assemblies.

In accordance with additional or alternative embodiments, the FCC includes an input blending algorithm configured to generate a pilot command input signal based on commands received at the activated ones of the first and second control stations.

In accordance with additional or alternative embodiments, the secondary monitoring system includes control input detection logic.

In accordance with additional or alternative embodiments, the secondary monitoring system determines that the commands are indicative of normal and intentional piloting inputs based on characteristics of the commands.

In accordance with additional or alternative embodiments, the first and second control stations each includes headphones, a primary flight display (PFD) and inceptors.

In accordance with additional or alternative embodiments, the control station cues include audio cues directed through the headphones, visual cues directed through the PFD and tactile cues directed through the inceptors to cue the flight crew that one of a pilot or a copilot is attempting to control the aircraft via a deactivated control station.

In accordance with additional or alternative embodiments, the control station cues include switch cues to cue the flight crew to activate the deactivated one of the first and second control stations.

In accordance with additional or alternative embodiments, the secondary monitoring system is further configured to automatically activate the deactivated one of the first and second control stations.

These and other advantages and features will become more apparent from the following description taken in conjunction with the drawings.

BRIEF DESCRIPTION OF DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

FIG. 2 is a front view of the aircraft of FIG. 1;

FIG. 3 is a schematic diagram of a flight control computer and control station features of the aircraft of FIGS. 1 and 2;

The detailed description explains embodiments of the disclosure, together with advantages and features, by way of example with reference to the drawings.

DETAILED DESCRIPTION OF THE DISCLOSURE

As will be described below, a secondary monitoring system is provided for use with an aircraft, such as a helicopter or another similar vehicle. The secondary monitoring system produces a robust time sensitive alert if a flight control system detects that someone is trying to fly the aircraft at a station that is turned off or otherwise in a failing or inoperative condition. Operations of the secondary monitoring system rely on the notion that aircraft flight control computers (FCCs) continuously receive inceptor input data but terminate the inputs while a control station is deselected. The secondary monitoring system uses this ignored input data to provide an alert to the crew if inputs from a deselected control station are considered to be "normal control type" inputs (e.g., by distinguishing between inputs that are consistent with someone trying to control the aircraft versus someone accidentally bumping into or falling on the stick). When terminated control inputs are detected, visual, aural, and tactile cues are presented to alert the crew that there is no control capability in the deselected control station. This quickly and intuitively cues the crew to reselect the control station being used.

For purposes of this disclosure, a "normal control type" input is one that has been determined by the relevant software algorithms to be indicative of a human attempt to control the aircraft, with input amplitude, rate and frequency content consistent with intentional physical pilot input. Inputs beyond the range of physical travel available, digital jumps in input position or high frequency inputs beyond human capability would each indicate a failure within the hardware or electrical signal processing. Constant non-zero inputs or single momentary inputs might indicate inadvertent commands such as leaning on or bumping the controls.

Figure 1:
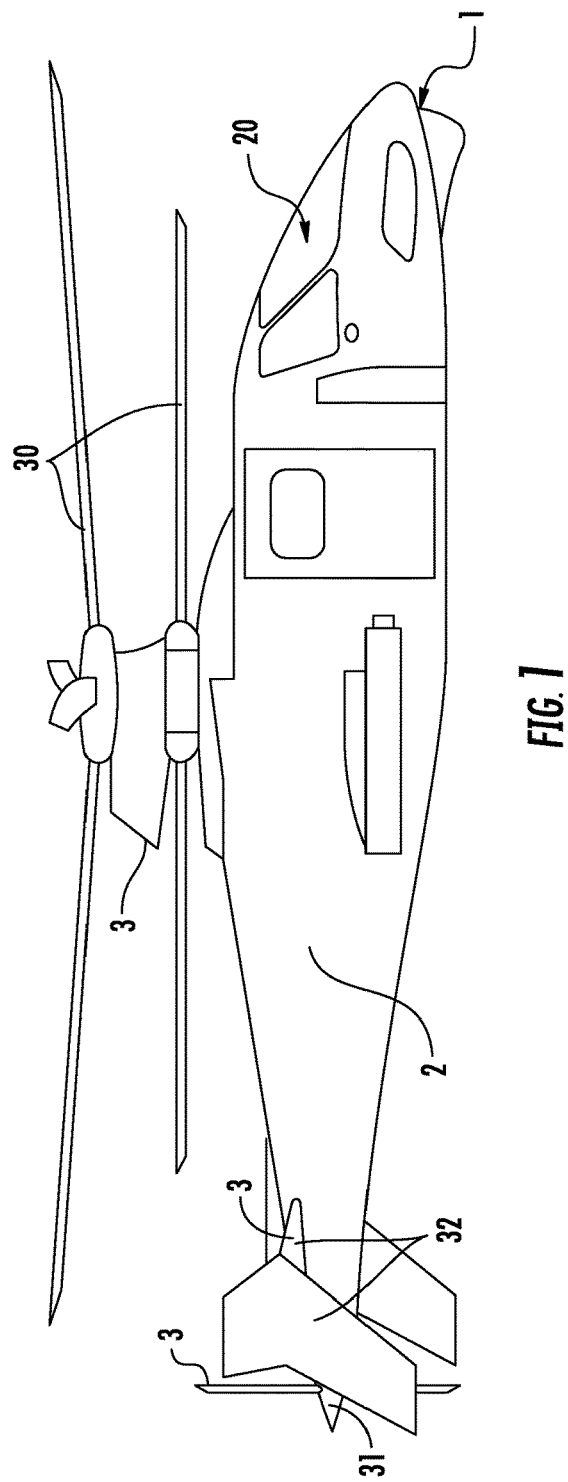
FIG. 1 is a side view of an aircraft in accordance with embodiments.

With reference to FIGS. 1-3, a ground-based vehicle or aircraft 1 is provided. The aircraft 1 may be configured in various manners including, but not limited to, being provided as a single rotor helicopter or as a compound helicopter. In either case, the aircraft 1 includes an airframe 2, flight control assemblies 3 and a flight control computer (FCC) 4. The airframe 2 is formed to define a cockpit 20 that can accommodate one or more crewmen and has a first control station 21 and a second control station 22. In accordance with embodiments, the first control station 21 may be disposed on a first side of the cockpit 20 and may be referred to as a pilot control station while the second control station 22 may be disposed on a second side of the cockpit 20 and may be referred to as a copilot control station.

During normal flight operations, the first control station 21 may be disposed in an activated condition or in a deactivated condition. Similarly, the second control station 22 may be disposed in an activated condition or in a deactivated condition. The first and second control stations 21 and 22 may be activated at a same time but cannot both be deactivated at a same time. That is, if the first control station 21 is deactivated or turned off, the second control station 22 is necessarily activated or turned on.

In accordance with embodiments and, as shown in FIG. 3, the first control station 21 may include headphones 210 for the pilot to wear so that he can hear information that might otherwise be drowned out by ambient noise, a primary flight display (PFD) 211 that the pilot can see in front of his face and a set of inceptors 212, such as a main control stick and a collective stick. As an additional or alternative option, the first control station 21 may include a helmet mounted display (MID), a heads-up display (HUD) or a warning display system on an instrument panel. Similarly, the second control station 22 may include headphones 220 for the copilot to wear so that he can hear information that might otherwise be drowned out by ambient noise, a primary flight display (PFD) 221 that the copilot can see in front of his face and a set of inceptors 222, such as a main control stick and a collective stick. As an additional or alternative option, the second control station 22 may include a helmet mounted display (HMD), a heads-up display (HUD) or a warning display system on an instrument panel.

The flight control assemblies 3 are operably disposed at multiple locations of the airframe 2. In an exemplary case in which the aircraft 1 is a compound helicopter, the flight control assemblies 3 include upper and lower coaxial, counter-rotating main rotors 30 at an upper portion of the airframe 2, a propeller or auxiliary propulsion assembly 31 at an aft end of a tail portion of the airframe 2 and, in some cases, horizontal and vertical stabilizing control surfaces 32 proximate to the propeller or auxiliary propulsion assembly 31. It is of course understood that these features are not required and, for example, may be replaced with a single rotor assembly and a tail rotor assembly at the upper portion of the airframe 2 and at the aft end of the tail portion of the airframe 2. Indeed, the present disclosure could apply to any multi-crew, fly-by-wire (FBW) aircraft configuration, including fixed wing applications, tilt rotors and tandem rotor helicopters. In any case, the flight control assemblies 3 are configured to generate lift and thrust for the aircraft 1 during flight operations and to provide for controlled flight and navigation during those flight operations.

The FCC 4 is housed or otherwise accommodated in the airframe 2 and includes a processing unit 40, a memory unit 41 and servo control unit 42. The memory unit 41 has executable instructions stored thereon, which, when executed, cause the processing unit 40 to operate. The servo control unit 42 controls operations of the flight control assemblies 3 and is in turn controlled by the processing unit 40. As a general matter, the FCC 4 is configured to control operations of the flight control assemblies 3 in accordance with at least current flight conditions and operator (or flight crew) inputted commands received at the first control station 21 when the first control station 21 is activated and at the second control station 22 when the second control station is activated.

To this end, the FCC 4 may further include an input blending algorithm 43. The input blending algorithm 43 is configured to generate a pilot command input signal based on operator inputted commands received at the activated ones of the first and second control stations 21 and 22. Thus, if both of the first and second control stations 21 and 22 are activated, the input blending algorithm 43 generates the pilot command input signal based on operator inputted commands received at both of the first and second control stations 21 and 22. However, if only the first control station 21 is activated, the input blending algorithm 43 generates the pilot command input signal based on operator inputted commands received at only the first control station 21. In conventional systems in this situation, commands received at the second control station 22 would be discarded. As will be described below, however, these commands are employed in a secondary monitoring system 44 of the FCC 4 for enhanced situational awareness and safety. Similarly, if only the second control station 22 is activated, the input blending algorithm 43 generates the pilot command input signal based on operator inputted commands received at only the second control station 22. Again, in conventional systems in this situation, commands received at the first control station 21 would be discarded but these commands are now employed in the secondary monitoring system 44 of the FCC 4 for safety purposes.

Figure 4:
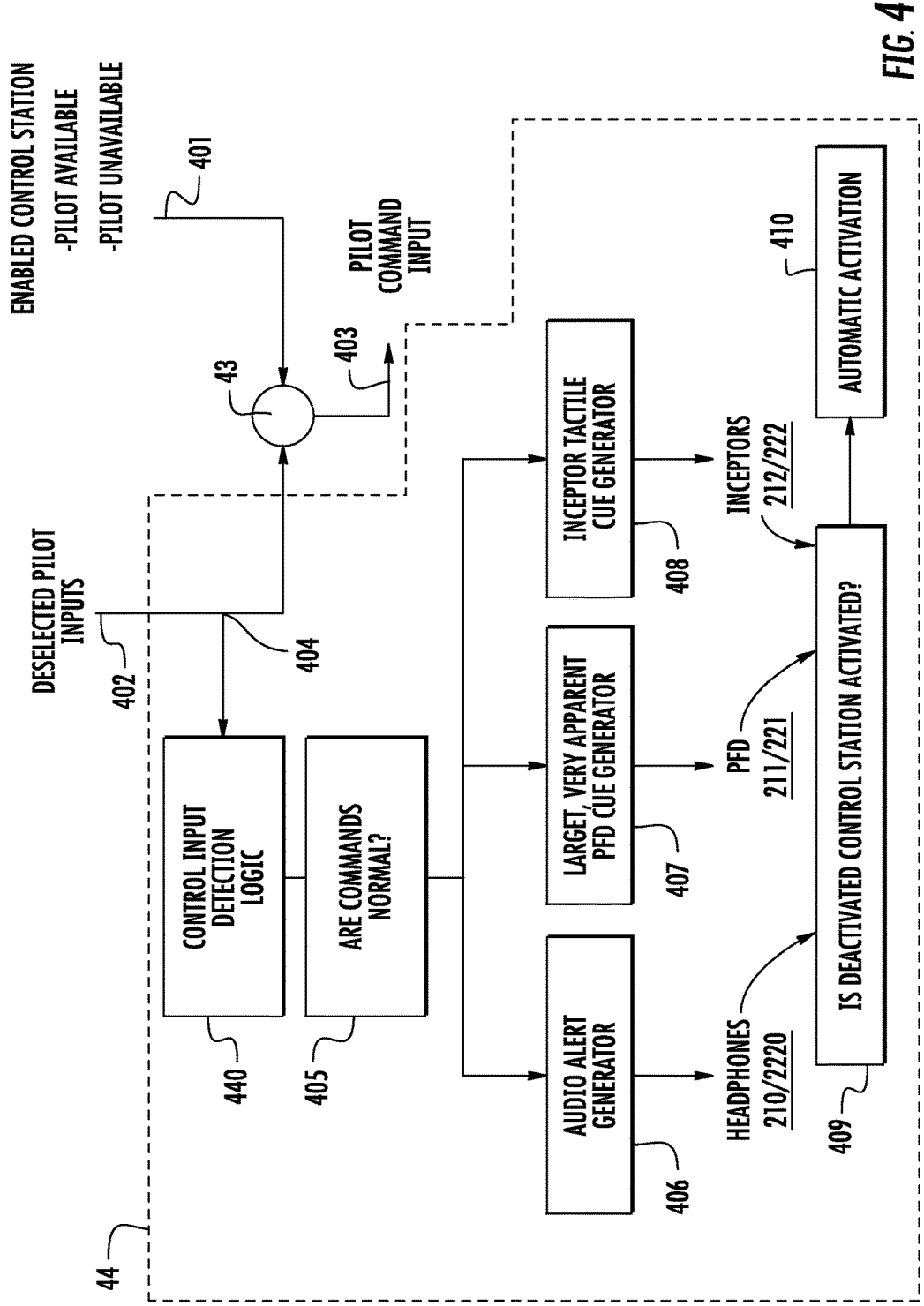
FIG. 4 is a schematic diagram illustrating an operation of a secondary monitoring system in accordance with embodiments.

With continued reference to FIG. 3 and with reference to FIG. 4, the FCC 4 includes the secondary monitoring system 44 although it is to be understood that the secondary monitoring system 44 could also be provided as a standalone system. In any case, the secondary monitoring system 44 is configured to identify when commands are input at a deactivated one of the first and second control stations 21 and 22, to determine whether the commands are indicative of normal and intentional piloting inputs and to generate control station cues in an event the commands are determined to be indicative of normal and intentional piloting inputs. In accordance with embodiments, the secondary monitoring system 44 may include control input detection logic 440, which determines that the commands are indicative of normal and intentional piloting inputs based on characteristics of the commands (i.e., whether the commands are reflective of deliberate and human attempts to fly the aircraft versus inadvertent or spurious inputs) and the current flight conditions and, more particularly, based on correlations between the characteristics of the commands and the current flight conditions.

During normal flight operations, a trained pilot will input commands to his control station that are consistent with the current flight conditions and are often characteristically smooth and of small amplitude in an event the current flight conditions are accordingly straightforward (i.e., non-combat situation, standard air speed and low wind). Therefore, if the current flight conditions dictate that the trained pilot should be making inputs of smooth, small amplitude commands, the control input detection logic 440 will determine that such smooth, small amplitude commands actually being made by the pilot are in fact normal types of commands.

In contrast to the situation laid out above, inputs by an untrained person or unintentional inputs to a control station tend to be inconsistent with the current flight conditions. These commands might be frantic or herky-jerky (as opposed to smooth) and could have relative large amplitudes even where the current flight conditions are straightforward. In such cases, if the current flight conditions dictate that the trained pilot should be making inputs of smooth, small amplitude commands, the control input detection logic 440 will determine that the unintentional commands are abnormal types of commands and will not be addressed. The control input detection logic 440 and the secondary monitoring system 44 as a whole may seek out inputs that are indicative of a failed system as well. Such inputs may present as relatively large, non-analog jumps in commands, commands beyond what should be physically possible and high frequency "buzzing" inputs. In each case, the failed-system-indicating inputs would be thrown out as not being reflective of a normal pilot input. That is, the control input detection logic 440 and the secondary monitoring system 44 as a whole seek to address, account for, and ignore untrained or unintentional inputs as well as spurious inputs due to electrical or mechanical failures (in, e.g., the inceptor,) while providing information and instruction to one or more cueing systems and alternatively commanding a deactivated station to be re-enabled.

In accordance with embodiments, the control station cues may include any one or more of audio cues that are directed through the headphones 210, 220, visual cues directed through the PFD 211, 221 (or through any or all of the HMD, the HUD or the warning display system) and tactile cues directed through the inceptors 212, 222. The audio cues may include auditory resume-input-of-command cues that serve to remind the pilot or the copilot sitting at the activated one of the first and second control stations 21 and 22 to resume making command inputs at the activated one of the first and second control stations 21 and 22. Additionally or alternatively, the audio cues may include auditory switch cues that serve to instruct the pilot or the copilot sitting at the deactivated one of the first and second control stations 21 and 22 to activate the deactivated one of the first and second control stations 21 and 22. The visual cues may include visual resume-input-of-command cues that serve to remind the pilot or the copilot sitting at the activated one of the first and second control stations 21 and 22 to resume making command inputs at the activated one of the first and second control stations 21 and 22. Additionally or alternatively, the visual cues may include visual switch cues that serve to instruct the pilot or the copilot sitting at the deactivated one of the first and second control stations 21 and 22 to activate the deactivated one of the first and second control stations 21 and 22. The tactile cues may include tactile or haptic resume-input-of-command cues that serve to remind the pilot or the copilot sitting at the activated one of the first and second control stations 21 and 22 to resume making command inputs at the activated one of the first and second control stations 21 and 22. Additionally or alternatively, the tactile cues may include tactile or haptic switch cues that serve to instruct the pilot or the copilot sitting at the deactivated one of the first and second control stations 21 and 22 to activate the deactivated one of the first and second control stations 21 and 22.

In accordance with embodiments, the primary target for the audio, visual and tactile cues is the pilot at the deselected station such that the audio, visual and tactile cues annunciate to the ineffective pilot that his inputs are not being transmitted to the aircraft. The pilot as the activated station is thus a secondary or optional target for resumption cueing. With that in mind, while it is possible to cue both stations that someone is making piloting inputs on a deselected station, it is to be understood that if only one station is going to be cued, that station should be the deselected station. Moreover, providing certain cues, such as tactile cues, to the active station may not make sense as it is possible that the pilot at the active station has relinquished control and may not even have hands on the inceptors.

Operations of the secondary monitoring system 44 will now be described with further reference to FIG. 4. At an initial stage, one of the first and second control stations 21 and 22 will be activated (401) and the other will be activated or deactivated (402). For purposes of clarity and brevity, it will be assumed that the first control station 21 is activated and that the second control station 22 is deactivated. In each case, however, commands inputted at the first and second control stations 21 and 22 will be combined at the input blending algorithm 43 such that the input blending algorithm 43 generates the pilot command input signal (403) based on operator inputted commands received at the activated ones of the first and second control stations 21 and 22.

The control input detection logic 440 analyzes the commands input at the deactivated second control station 22 (404) by identifying when commands are input at the deactivated second control station 22 and then determining whether the commands are normal as described above (405). In an event the commands are determined to be normal, the auditory, visual and/or tactile control station cues are generated (406, 407 and 408).

In accordance with further embodiments and, as shown in FIG. 4, the secondary monitoring system 44 may be further configured to determine whether the deactivated second control station 22 is activated following a predefined period of time (409) and to automatically activate the deactivated second control station 22 in an event the second control station 22 remains deactivated (410). Thus, if the pilot and the copilot are both ignoring the auditory, visual and/or tactile control station cues, the deactivated control station can still be activated eventually. Such reselection algorithms would also consider whether or not the deactivated station is fully functional or exhibits indication of hardware failure, as part of the determination to activate the previously deactivated station.

Figure 5:
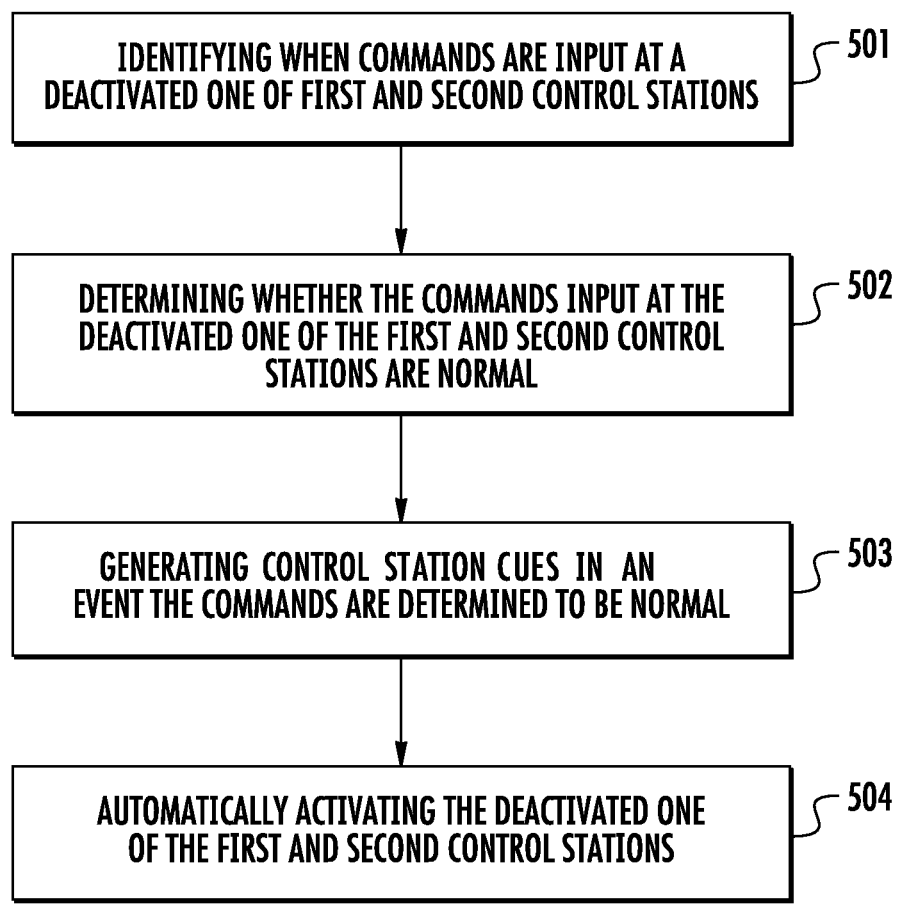
FIG. 5 is a flow diagram illustrating a method of operating a station deselect safety and cueing system in accordance with embodiments.

With reference to FIG. 5, a method of operating a station deselect safety and cueing system is provided. The method includes identifying when commands are input at a deactivated one of first and second control stations at block 501, determining whether the commands input at the deactivated one of the first and second control stations are indicative of normal and intentional piloting inputs at block 502 and generating control station cues in an event the commands are determined to be indicative of normal and intentional piloting inputs at block 503.

In accordance with embodiments, the determining of block 502 may include a determining operation design to ascertain whether or not the commands are indicative of normal and intentional piloting inputs based on characteristics of the commands (i.e., whether the commands are reflective of deliberate and human attempts to fly the aircraft versus inadvertent or spurious inputs) and current flight conditions or, in some cases, based on correlations between the commands where the pilot's intent is known and understood and the current flight conditions. In accordance with further embodiments, the method may include automatically activating the deactivated one of the first and second control stations following a predefined period of time in which activation does not otherwise occur at block 504, as long as the deactivated station is determined to be otherwise functional.

The embodiments described above allow for advantages of fly-by-wire in that either the pilot or copilot control stations in a given aircraft can be turned off without presenting a risk of confusion or delay due to a pilot or copilot attempting to fly an aircraft with controls that are turned off. Further embodiments may also be applied to the case of ground-based vehicles, such as cars and trucks, which may be used for multiple purposes including, but not limited to, driving instruction. In such cases, steering, acceleration and deceleration are controllable in the driver's seat (i.e., the first control station 21) and optionally in the passenger's seat (i.e., the second control station 22).

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. A method of operating a station deselect safety and cueing system for a flight crew of an aircraft, the method comprising:
identifying when commands are input at a deactivated one of first and second control stations;
determining whether the commands input at the deactivated one of the first and second control stations are indicative of normal and intentional piloting inputs; and
generating control station cues for the flight crew in an event the commands are determined to be normal.

2. The method according to claim 1, wherein the commands are indicative of normal and intentional piloting inputs based on characteristics of the commands.

3. The method according to claim 1, wherein the generating of the control station cues comprises generating audio switch cues to cue the flight crew that one of a pilot or a copilot is attempting to control the aircraft via a deactivated control station.

4. The method according to claim 1, wherein the generating of the control station cues comprises generating visual switch cues to cue the flight crew that one of a pilot or a copilot is attempting to control the aircraft via a deactivated control station.

5. The method according to claim 1, wherein the generating of the control station cues comprises generating tactile switch cues to cue the flight crew that one of a pilot or a copilot is attempting to control the aircraft via a deactivated control station.

6. The method according to claim 1, further comprising automatically activating the deactivated one of the first and second control stations.

7. An aircraft, comprising:
an airframe defining a cockpit with first and second control stations that are configured for co-activation and complementary deactivation;
flight control assemblies operably disposed at multiple locations of the airframe;
a flight control computer (FCC) configured to control operations of the flight control assemblies in accordance with current flight conditions and commands received at activated ones of the first and second control stations that are inputted by a flight crew,
the FCC comprising a secondary monitoring system to identify when commands are input at a deactivated one of the first and second control stations, to determine whether the commands are indicative of normal and intentional piloting inputs and to generate control station cues in an event the commands are indicative of normal and intentional piloting inputs.

8. The aircraft according to claim 7, wherein the flight control assemblies comprise main rotor assemblies, propeller or auxiliary propulsion assemblies, and controllable surface assemblies.

9. The aircraft according to claim 7, wherein the FCC comprises an input blending algorithm configured to generate a pilot command input signal based on commands received at the activated ones of the first and second control stations.

10. The aircraft according to claim 7, wherein the secondary monitoring system comprises control input detection logic.

11. The aircraft according to claim 7, wherein the secondary monitoring system determines that the commands are indicative of normal and intentional piloting inputs based on characteristics of the commands.

12. The aircraft according to claim 7, wherein the first and second control stations each comprise headphones, a primary flight display (PFD) and inceptors.

13. The aircraft according to claim 7, wherein the control station cues comprise audio cues directed through the headphones, visual cues directed through the PFD and tactile cues directed through the inceptors to cue the flight crew that one of a pilot or a copilot is attempting to control the aircraft via a deactivated control station.

14. The aircraft according to claim 7, wherein the control station cues comprise switch cues to cue the flight crew to activate the deactivated one of the first and second control stations.

15. The aircraft according to claim 7, wherein the secondary monitoring system is further configured to automatically activate the deactivated one of the first and second control stations.

* * * * *